(12) United States Patent
Tanaka et al.

(10) Patent No.: US 9,802,556 B2
(45) Date of Patent: Oct. 31, 2017

(54) ELECTRIC VEHICLE

(71) Applicant: SUZUKI MOTOR CORPORATION, Hamamatsu-Shi, Shizuoka-Ken (JP)

(72) Inventors: Junichiro Tanaka, Hamamatsu (JP); Naoya Murota, Hamamatsu (JP); Mitsunobu Terada, Hamamatsu (JP); Ryo Ito, Hamamatsu (JP); Tomohiro Yamada, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/335,899

(22) Filed: Oct. 27, 2016

(65) Prior Publication Data

US 2017/0113634 A1 Apr. 27, 2017

(30) Foreign Application Priority Data

Oct. 27, 2015 (JP) ................................ 2015-210398

(51) Int. Cl.
| | |
|---|---|
| *B60R 16/02* | (2006.01) |
| *B60K 1/04* | (2006.01) |
| *B60K 7/00* | (2006.01) |
| *B62M 7/10* | (2006.01) |

(52) U.S. Cl.
CPC ............ *B60R 16/0207* (2013.01); *B60K 1/04* (2013.01); *B60K 7/0007* (2013.01); *B60R 16/02* (2013.01); *B60K 2007/0038* (2013.01); *B62M 7/10* (2013.01)

(58) Field of Classification Search
CPC ....... B60R 16/02; B60R 16/0207; B60K 1/04; B60K 7/0007; B60K 2007/0076; B60K 2007/0092; B60K 2007/0069
See application file for complete search history.

(56) References Cited

U.S. PATENT DOCUMENTS

| | | | | |
|---|---|---|---|---|
| 5,610,814 A | * | 3/1997 | Sugioka | .................... B60L 3/00 180/273 |
| 6,037,726 A | * | 3/2000 | Tabata | ................. B60K 7/0007 180/65.8 |
| 7,931,110 B2 | * | 4/2011 | Nishiura | ................. B60L 11/18 180/218 |
| 8,002,067 B2 | * | 8/2011 | Nishiura | .............. B62K 25/283 180/218 |
| 8,028,785 B2 | * | 10/2011 | Kanno | ................. B60K 7/0007 180/220 |
| 8,443,926 B2 | * | 5/2013 | Kanno | ................. B60L 3/0023 180/220 |

(Continued)

*Primary Examiner* — Erez Gurari
(74) *Attorney, Agent, or Firm* — Barnes & Thornburg LLP

(57) ABSTRACT

An electric vehicle includes a wire harness that flexibly follows the swinging of the swing arm, surely avoids any contact with other components, and has excellent durability. The electric vehicle includes a battery mounted to a frame, an inverter and an electric motor accommodated in a swing arm, and a wire harness wired between the frame and the swing arm. The swing arm includes a hollow pivot section, and a partition wall partitioning the pivot section and an arm section. The wire harness suspends from the frame side, enters inside the pivot section from the top face side of the pivot section, and is bent inside the pivot section reaching the inverter through the partition-wall through port.

16 Claims, 9 Drawing Sheets

(56) References Cited

U.S. PATENT DOCUMENTS

| | | | |
|---|---|---|---|
| 8,505,668 B2 * | 8/2013 | Iwakami | B60K 1/04 180/211 |
| 8,556,019 B2 * | 10/2013 | Kuroki | B60K 6/48 180/220 |
| 8,596,401 B2 * | 12/2013 | Ishikawa | B62M 7/04 180/220 |
| 8,640,810 B2 * | 2/2014 | Tsukamoto | B62K 11/10 180/220 |
| 8,733,486 B2 * | 5/2014 | Nishiura | B60K 1/04 180/220 |
| 8,776,936 B2 * | 7/2014 | Mimura | B60K 7/0007 180/220 |
| 8,813,891 B2 * | 8/2014 | Tsukamoto | B60K 1/04 180/220 |
| 8,936,129 B2 * | 1/2015 | Honda | B62K 11/10 180/220 |
| 8,950,539 B2 * | 2/2015 | Buell | B62K 11/00 180/220 |
| 8,973,697 B2 * | 3/2015 | Matsuda | B62K 11/04 123/41.72 |
| 9,187,008 B2 * | 11/2015 | Inoue | B62J 9/00 |
| 9,346,421 B2 * | 5/2016 | Miyashiro | B62M 6/90 |
| 9,434,243 B2 * | 9/2016 | Nakao | B60K 1/04 |
| 9,579,983 B2 * | 2/2017 | Inoue | B62K 19/30 |
| 9,598,132 B2 * | 3/2017 | Eguchi | B62H 1/02 |
| 2012/0103710 A1 * | 5/2012 | Atsuchi | B60K 1/04 180/65.31 |
| 2013/0241366 A1 * | 9/2013 | Kim | H02K 3/28 310/67 R |
| 2013/0270938 A1 * | 10/2013 | Matsuda | B60K 1/00 310/54 |
| 2015/0008053 A1 * | 1/2015 | Matsuda | B62K 11/04 180/65.1 |
| 2015/0266535 A1 * | 9/2015 | Marioni | B60K 1/00 180/220 |
| 2015/0291046 A1 * | 10/2015 | Kawabata | B60L 11/1818 180/220 |
| 2015/0329176 A1 * | 11/2015 | Inoue | B62K 19/30 180/220 |

* cited by examiner

ELECTRIC VEHICLE

CROSS-REFERENCE TO RELATED APPLICATIONS

This application claims the benefit of priority of Japanese Patent Application No. 2015-210398, filed on Oct. 27, 2015, the entire contents of which are incorporated herein by reference.

BACKGROUND OF THE INVENTION

Field of the Invention

The present invention relates to an electric vehicle.

Description of the Related Art

There is known an electric vehicle includes a swing arm swingably attached to a vehicle body of the electric vehicle, an electric motor accommodated in the swing arm, and a linear duct having one end part connected to a notch for duct and another end part pointing toward the vehicle body side.

In a conventional electric vehicle, a wire harness transmitting power for driving the electric motor is disposed within the duct. The swing arm is swingably attached with a pivot shaft located to the front of the vehicle body. The one end part of the duct is connected to an upper face of the swing arm to the front of the vehicle body.

SUMMARY OF THE INVENTION

To supply a large amount of power to be consumed at the electric motor driving a driving wheel, the wire harness wired between a body frame and a swing arm is thicker and stiffer compared to those of a signal line.

The swing arm, which accommodates the electric motor, swings toward the body frame to enhance the ground contact force of the driving wheel and buffer the load from the road to the vehicle body.

Thus, the wire harness wired between the body frame and the swing arm preferably has a margin, that is, deflection so as not to impede the swinging of the swing arm, to avoid interference with the swing arm, and to have excellent durability.

To solve the problems described above, it is an object of the present invention to provide an electric vehicle including a wire harness that flexibly follows the swinging of the swing arm, surely avoids any contact with other components, and has excellent durability.

To achieve the above object, an aspect of the present invention provides an electric vehicle including a frame, a driving wheel, a battery mounted to the frame, a pivot shaft provided on the frame, a swing arm swingably supported by the frame via the pivot shaft, and supporting the driving wheel, an inverter accommodated in the swing arm, a electric motor accommodated in the swing arm and rotating the driving wheel by power supplied from the inverter, and a wire harness wired between the frame and the swing arm, the wire harness including a power line electrically connecting at least the battery and the inverter. The swing arm includes: a hollow pivot section swingably supported by the pivot shaft, the hollow pivot section extending in a width direction of the frame, a hollow arm extending rearward from the pivot section and supporting the driving wheel, and a partition wall partitioning the pivot section and the arm section, and extending in a front and rear direction and an up and down direction of the frame. The inverter and the electric motor are accommodated in the arm section. The partition wall has a partition-wall through port. The wire harness is wired from the pivot section side to the arm section side through the partition-wall through port. The wire harness suspends from the frame side, enters inside the pivot section from the top face side of the pivot section, and is bent inside the pivot section reaching the inverter through the partition-wall through port.

In preferred embodiments of the above aspect, the following modes may be provided.

It may be desired that the pivot section has an upper through port disposed in a top face. The wire harness is passed across a gap through the upper through port. The electric vehicle includes a seal part water tightly sealing a gap between the partition wall and the wire harness, and a protection part provided on an edge of the upper through port and preventing interference between the wire harness and the pivot section.

It may be desired that the wire harness has a horizontal portion disposed in a horizontal direction on the frame. The electric vehicle includes a holding part secured to the frame and holding the horizontal portion of the wire harness.

It may be further desired that a signal line wiring between the frame and the swing arm, and electrically connected to the inverter, and a relaying connector provided within the pivot section and relaying the signal line.

It may be desired that the pivot section has a working port for use when performing wiring work of the wire harness.

This electric vehicle includes the wire harness that flexibly follows the swinging of the swing arm, surely avoids any contact with other components, and has excellent durability.

DETAILED DESCRIPTION OF THE PREFERRED EMBODIMENTS

Hereinafter, an embodiment of an electric vehicle according to the present invention will be described with reference to FIGS. 1 to 9.

Figure 1:
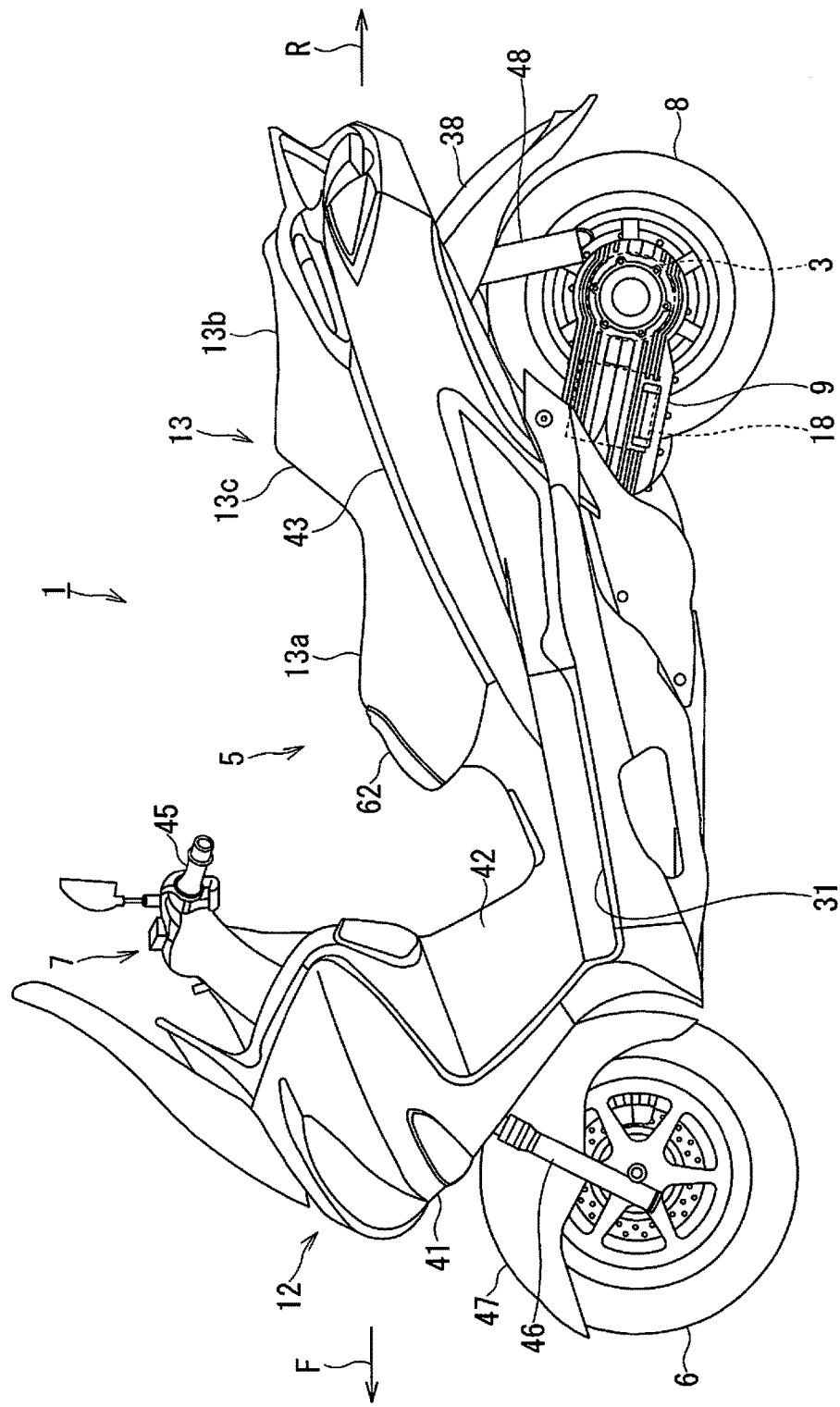
FIG. 1 is a left side view of an electric vehicle according to an embodiment of the present invention.

FIG. 1 is a left side view of the electric vehicle according to an embodiment of the present invention.

Figure 2:
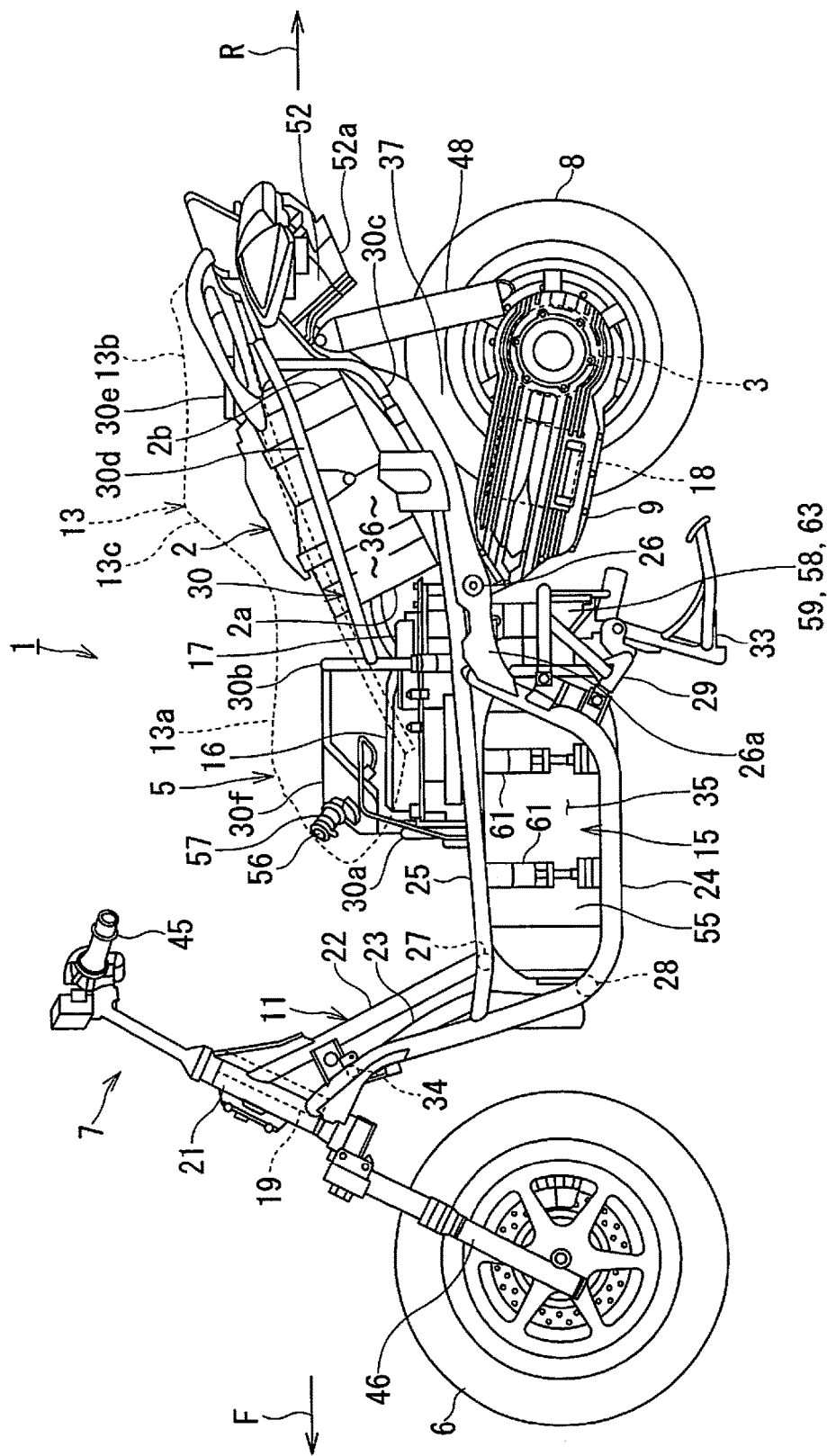
FIG. 2 is a left side view of the electric vehicle according to the embodiment of the present invention, with its exteriors being detached.

FIG. 2 is a left side view of the electric vehicle according to an embodiment of the present invention, with its exteriors, for example, covers and a seat being detached.

Figure 3:
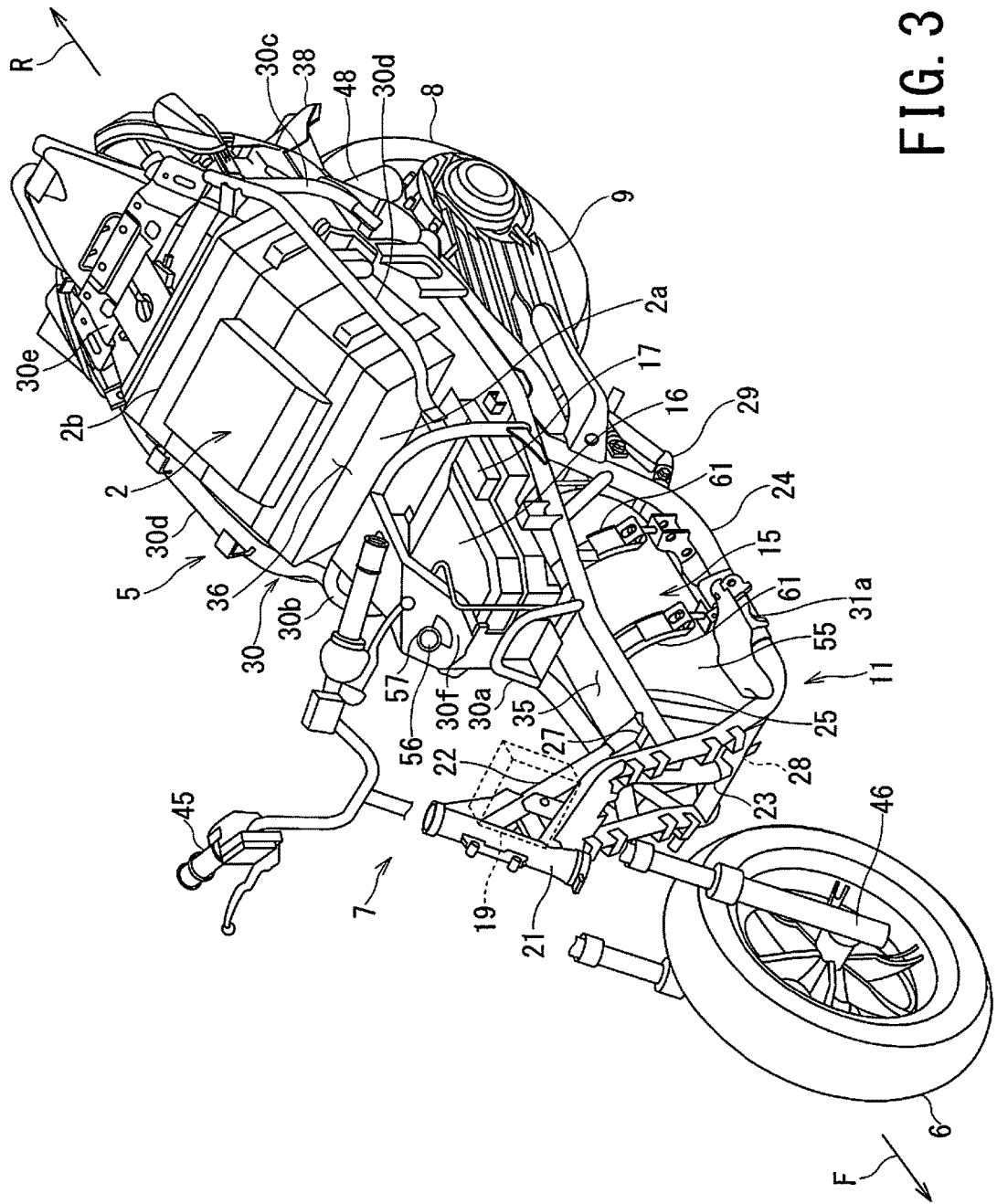
FIG. 3 is a perspective view of the electric vehicle according to the embodiment of the present invention, with its exteriors being detached.

FIG. 3 is a perspective view of the electric vehicle according to an embodiment of the present invention, with its exteriors, for example, covers and a seat being detached.

Note that expressions of front-and-rear, up-and-down, and left-and-right in the present embodiment are based on reference to a rider onboard an electric vehicle 1. In FIGS. 1 to 3, a solid line arrow F represents forward of the electric vehicle 1, and a solid line arrow R represents reward of the electric vehicle 1.

As shown in FIGS. 1 to 3, the electric vehicle 1 according to the present embodiment travels by being driven by an electric motor 3 powered by a fuel cell 2. The electric vehicle 1 is a motorcycle of motor-scooter type, and also a fuel cell powered bicycle traveling by the power of the fuel cell 2. The electric vehicle 1 may also be a tricycle. It may be a type of vehicle that travels by being driven by the electric motor 3 that is powered by a rechargeable battery (not shown) in place of the fuel cell 2.

The electric vehicle 1 includes a vehicle body 5 extending forward and rearward, a front wheel 6 as a steered wheel, a steering mechanism 7 supporting the front wheel 6 in a steerable manner, a rear wheel 8 as a driving wheel, a swing arm 9 supporting the rear wheel 8 so as to be swingable in the up and down direction, and the electric motor 3 which generates driving power of the rear wheel 8.

The vehicle body 5 includes a frame 11 extending forward and rearward of the vehicle, an exterior 12 covering the frame 11, and a seat 13 disposed above a rear half part of the frame 11.

Further, the vehicle body 5 includes a fuel cell 2, a fuel tank 15 configured to store high pressure gas of hydrogen as a fuel to be used for power generation in the fuel cell 2, a rechargeable battery. 16 configured to supplement power of the fuel cell 2, a power management apparatus 17 configured to adjust output voltage of the fuel cell 2 and control power distribution between the fuel cell 2 and the rechargeable battery 16, an inverter 18 configured to convert DC power outputted by the power management apparatus 17 into three-phase AC power and outputs it to the electric motor 3 to operate the electric motor 3, and a vehicle controller 19 configured to comprehensively control those mentioned before.

A power train of the electric vehicle 1 includes the fuel cell 2 and the rechargeable battery 16, is a system which appropriately utilizes power of each power supply depending on travelling conditions of the vehicle, power generation conditions of the fuel cell 2, and power storage conditions of the rechargeable battery 16. The electric vehicle 1 generates regenerative power at the electric motor 3 during deceleration. The rechargeable battery 16 and the fuel cell 2, which are power sources of the vehicle, are connected in parallel to the inverter 18 and supply power to the electric motor 3. The rechargeable battery 16 stores regenerative power generated at the electric motor 3 when the electric vehicle 1 decelerates, and power generated by the fuel cell 2.

The frame 11 is made up of a plurality of steel hollow pipes combined into a single body. The frame 11 includes a head pipe 21 disposed above the front end of the frame 11, an upper down-frame 22 extending from a central part of the head pipe 21 in a rearwardly and downwardly inclined manner, a lower down-frame 23 disposed below the head pipe 21 and extending in a rearwardly and downwardly inclined manner, a pair of left and right lower frames 24, a pair of left and right upper frames 25, a pivot shaft 26, an upper bridge frame 27, a lower bridge frame 28, a guard frame 29, and a mounted-instrument protection frame 30.

The head pipe 21 supports the steering mechanism 7 so as to be steerable, that is, to be swingable in the left and right direction of the electric vehicle 1.

The pair of left and right lower frames 24 are disposed in the left and the right of the lower down-frame 23 and connected to a lower part of the head pipe 21. The pair of left and right lower frames 24 each include a front-side inclined portion extending from a connected portion with the head pipe 21 substantially in parallel along the lower down-frame 23 and in a rearwardly and downwardly inclined manner, a front-side curved portion curved rearwardly at a lower end of the front-side inclined portion, and a straight portion extending substantially horizontally from a rear end of the front-side curved portion toward rearward of the vehicle body 5 in a linear manner until reaching a central portion of the vehicle body 5, that is, a central portion in the front and rear direction of the electric vehicle 1. The pair of left and right lower frames 24 each include a rear-side curved portion curved toward rearward and upward from a rear end part of the straight portion, a rear-side inclined portion extending from an upper end part of the rear-side curved portion in a rearwardly and upwardly inclined manner, and an upper and lower frame joining part connecting the rear-side inclined portion to the upper frame 25. A spacing between the left and right lower frames 24 is wider than that between the left and right upper frames 25.

A near-head-pipe bridge frame 34 is constructed between upper parts of the left and right lower frames 24. The near-head-pipe bridge frame 34 extends in a linear manner substantially in the left and right direction of the electric vehicle 1. Each of the left and right lower frames 24 includes a foot rest bracket 31a. The foot rest bracket 31a supports a foot board 31, which is disposed on the outer side of the front-side curved portion, from below. A rider can lay its foot on the foot board 31.

The lower frame 24 being disposed on the left side of the vehicle body 5 includes a side stand bracket (not shown). The side stand bracket (not shown) is provided with a side stand (not shown) configured to make the electric vehicle 1 stand by itself in a leftwardly inclined manner. The side stand swings between an erected position for making the electric vehicle 1 stand by itself, and a retracted position for making it stay along the vehicle body 5 so as not to impede travelling.

The pair of left and right upper frames 25 are connected to a central part in the up-and-down direction of the front-side inclined portion of the lower frame 24 in a front half part of the vehicle body 5. The pair of left and right upper frames 25 each include, horizontal portions extending from a connected portion with the front-side inclined portion of the lower frame 24 toward rearward of the vehicle body 5 in a substantially horizontal manner, and rear end parts being rear ends of the horizontal portions of the pair of left and right upper frames 25, the rear end parts being significantly inclined rearwardly and upwardly in the rear half part of the vehicle body 5 and above the rear wheel 8, the rear end parts curved inwardly in the left and right direction of the vehicle body 5 to come close to each other to an extent of about thickness (width size) of the rear wheel 8.

The pivot shaft 26 is constructed between the left and right upper frames 25 in the rear half part of the vehicle body 5. The pivot shaft 26 is constructed between a pair of left and right brackets 26a. Each of the brackets 26a is located below the upper frame 25 and in the rear of a merging portion (upper and down frame joining part) between the upper frame 25 and the lower frame 24. Each of the brackets 26a is connected to the horizontal portion of the upper frame 25, and to the rear-side inclined portion of the lower frame 24.

The upper bridge frame 27 is constructed between the front end parts of the left and right upper frames 25. The upper bridge frame 27 extends substantially linearly in the left and right direction of the vehicle between the left and right upper frames 25 to interconnect the left and right upper frames 25.

The lower bridge frame 28 is constructed between the front-side curved portions of the left and right lower frames 24. The lower bridge frame 28 extends substantially linearly in the left and right direction of the vehicle between the left and right lower frames 24 to interconnect the left and right lower frames 24.

The guard frame 29 is constructed between the rear-side curved portions of the left and right lower frames 24. The guard frame 29 extends rearwardly and downwardly from a connected portion with the left and right lower frames 24, and extends into a rearwardly declined U-shape so as to enlarge the internal space of the frame 11. The guard frame 29 is provided with a center stand 33 configured to make the electric vehicle 1 stand by itself in an upright state. The center stand 33 swings between an erected position for making the electric vehicle 1 stand by itself, and a retracted position for making it stay along the vehicle body 5 so as not to impede travelling.

The upper down-frame 22 is constructed between the head pipe 21 and the upper bridge frame 27.

The lower down-frame 23 includes an upper end part connected to a central part in the left and right direction of the electric vehicle 1 of a near-head-pipe bridge frame 34 constructed between the left and right lower frames 24, and a lower end part connected to a central part in the left and right direction of the electric vehicle 1 of the lower bridge frame 28.

The mounted-instrument protection frame 30 is provided above the rear half part of the upper frame 25. The mounted-instrument protection frame 30 supports and secures the fuel cell 2 to the electric vehicle 1. A part of the mounted-instrument protection frame 30 can be attached and detached to and from the upper frame 25.

The seat 13 extends forward and rearward covering an upper section of the rear half part of the frame 11. The seat 13 is of a tandem type and includes a front half part 13a on which the rider is to be seated, a rear half part 13b on which a passenger is to be seated, and an inclined part 13c between the front half part 13a and the rear half part 13b.

Here, a space surrounded by the left and right upper frames 25 and the left and right lower frames 24 is referred to as a center tunnel region 35. A space surrounded by the rear half part of the upper frame 25, exterior 12, and the seat 13 as an instrument mounting region 36. A space in the rear of the center tunnel region 35 and below the instrument mounting region 36 as a tire house region 37.

The center tunnel region 35 accommodates the fuel tank 15. In the electric vehicle 1 of a motor-scooter type according to the present embodiment, the center tunnel region 35 is disposed along the front and rear direction of the electric vehicle 1 and between left and right foot boards 31 on which the rider places its foot, and rises higher than the foot board 31 such that the foot resting region of the foot board 31 is divided into left and right sections. In other words, the foot board 31, which serves as the foot resting region, is disposed in the left and right of the center tunnel region 35, and the fuel tank 15 is disposed between the left and right foot boards 31.

The instrument mounting region 36 accommodates the rechargeable battery 16, the power management apparatus 17, and the fuel cell 2 in this order from the front side of the vehicle body 5. The mounted-instrument protection frame 30 protects the front end part, the central part, the rear end part, and a side part ranging from the central part to the rear end part of the instrument mounting region 36.

The mounted-instrument protection frame 30 surrounds the instrument mounting region 36 and protects instruments to be mounted in the instrument mounting region 36. The mounted-instrument protection frame 30 includes a front protection frame 30a disposed in the front end part of the instrument mounting region 36, the front protection frame 30a being constructed between the left and right upper frames 25 in an upwardly convex arch shape, a center protection frame 30b disposed in a central part of the instrument mounting region 36 and in the rear of a merging spot between the upper frame 25 and the lower frame 24, the center protection frame 30b being constructed between the left and right upper frames 25 in an upwardly convex arch shape, a pair of left and right rear protection frames 30c disposed at a rear end part of the instrument mounting region 36, the pair of left and right rear protection frames 30c being connected to a portion where each of the left and right upper frames 25 is curved inwardly, the pair of left and right rear protection frames 30c extending rearward and obliquely upward from the curved portion, a pair of left and right side protection frames 30d extending rearward from each of the left and right of the center protection frame 30b to be connected to the upper end parts of the rear protection frames 30c, the pair of left and right side protection frames 30d reaching the rear end part of the vehicle body 5, a bracket 30e constructed between rear end parts of the left and right side protection frames 30d.

The left and right upper frames 25 are bent at a spot where the lower ends of the front protection frame 30a are joined thereto, increase the spacing therebetween toward the rear of the electric vehicle 1. The left and right upper frames 25 are bent at a spot where the lower ends of the center protection frame 30b are joined thereto, and extend to the rear of the electric vehicle 1. Thus, the center protection frame 30b has a larger width and a larger height than those of the front protection frame 30a. The rear protection frame 30c and the pair of the left and right side protection frames 30d are integrated.

The rear protection frame 30c and the pair of left and right side protection frames 30d are detachably interconnected to the center protection frame 30b and the upper frames 25, thereby supporting the fuel cell 2.

A rear wheel 8 is disposed in the tire house region 37.

Between the instrument mounting region 36 and the tire house region 37, a rear fender 38 as a partition member for dividing respective regions is provided.

The exterior 12 includes, a front leg-shield cover 41 covering a front half part of the vehicle body 5, a front frame cover 42 disposed above the center of the vehicle body 5 and covering an upper section of the upper frame 25 such as the center tunnel region 35, and a frame cover 43 disposed in a rear half part of the vehicle body 5 and covering a lower portion of the seat 13.

The frame cover 43 along with the seat 13 surrounds the instrument mounting region 36. The instrument mounting region 36 is a closed space surrounded by the seat 13, the frame cover 43, and the rear fender 38. The instrument mounting region 36 easily and securely controls flow of air to the fuel cell 2 by means of a vent hole (not shown) provided in an appropriate area of the frame cover 43 or the rear fender 38, and also easily and securely controls flow of air as a cooling wind to an apparatus, which needs to be cooled. The instrument mounting region 36 allows air to enter from, for example, a joint of each cover (such as the front frame cover 42, and a frame cover 43).

The steering mechanism 7 is disposed in a front section of the vehicle body 5 and swings in the left and right direction centering on the head pipe 21 of the frame 11, thereby enabling steering of the front wheel 6. The steering mechanism 7 includes a handle 45 provided in a top part, and a pair of left and right front forks 46 interconnecting the handle 45 and the front wheel 6, and the pair of left and right front forks 46 extending in the up and down direction slightly inclined rearwardly. The left and right front forks 46 have a telescopic structure that can be elastically expanded and contracted. An axle (not shown) for rotatably supporting the front wheel 6 is constructed between lower end parts of the left and right front forks 46. The front fender 47 is disposed above the front wheel 6. The front fender 47 is located between the left and right front forks 46, and secured to the front fork 46.

The front wheel 6 is a driven wheel that is rotatable about the axle constructed between the lower end parts of the left and right front forks 46.

The swing arm 9 swings in the up and down direction about the pivot shaft 26 as a rotational center extending in the left and right direction of the vehicle body 5. The swing arm 9 rotatably supports the rear wheel 8 between a pair of arms extending in the front and rear direction on left and right sides of the vehicle body 5, respectively. A rear suspension 48 is constructed between the frame 11 and the swing arm 9. The upper end part of the rear suspension 48 is swingably supported at the rear end part of the upper frame 25. The lower end part of the rear suspension 48 is swingably attached to the rear end part of the swing arm 9. The rear suspension 48 buffers the swinging of the swing arm 9.

The swing arm 9 accommodates a electric motor 3 rotationally driving the rear wheel 8, and an inverter 18 converting DC power supplied from the fuel cell 2 into AC power to supply it to the electric motor 3.

The electric motor 3 rotationally drives the rear wheel 8 with power supplied from the fuel cell 2 or the rechargeable battery 16, thereby causing the electric vehicle 1 to travel. The electric motor 3 is accommodated in a rear part of the swing arm 9 and coaxially disposed with the axle of the rear wheel 8. The electric motor 3 is integrally assembled to the swing arm 9 to constitute a unit-swing-type swing arm.

The inverter 18 is accommodated in a front part of the swing arm 9, and disposed between the pivot shaft 26 and the electric motor 3. The inverter converts DC power outputted by the power management apparatus 17 into three-phase AC power, and adjusts the rotational speed of the electric motor 3 by altering the frequency of the AC power.

The rear wheel 8 is the driving wheel being supported by the axle (not shown) to which driving force is transferred from the electric motor 3.

The fuel cell 2 generates power by causing reaction between a fuel and an oxidizing agent. The fuel cell 2 is an air-cooled fuel cell system generating power by using a high pressure gas, for example, hydrogen gas as the fuel, and oxygen in the air as the oxidizing agent, and is cooled by using air.

The fuel cell 2 is disposed on the rear half side of the instrument mounting region 36. The fuel cell 2 is disposed below the seat 13 over a range from an inclined part between the front half part 13a and rear half part 13b to the rear half part 13b. That is, in the side view of the vehicle, the fuel cell 2 is disposed between the rear half part 13b of the seat 13, on which the passenger is to be seated, and the rear wheel 8 and the swing arm 9.

The fuel cell 2 has a cuboidal shape having a long side extending in the front and rear direction of the vehicle body 5, and is disposed in the instrument mounting region 36 in a posture in which its front face, in which the intake port 2a is disposed, faces forward and obliquely downward, and its back face, in which the exhaust port 2b is disposed, faces rearward and obliquely upward. That is, the fuel cell 2 is secured to the frame 11 in a forward leaning posture in which its front side is located lower than its rear side. The upper part of the fuel cell 2 is secured to a mounted instrument protection frame 30 and the lower part of the fuel cell 2 is secured to the upper frame 25.

The fuel cell 2 includes a plurality of flat modules interconnected from the front side toward the rear side. The fuel cell 2 includes a filter (not shown), an intake shutter (not shown), a fuel cell stack (not shown), a fan (not shown), and an exhaust shutter (not shown), which are interconnected by being superposed on each other in a laminated state in order from the front side. A fuel cell control unit (not shown) is provided on the top face of the fuel cell 2.

The intake shutter includes an openable/closable intake port 2a of air, and configured to control the amount of air introduced to the fuel cell stack by opening/closing the intake port 2a. The intake shutter configured to constitute a circulation path for circulating air in the fuel cell 2 by closing the intake port 2a. The exhaust shutter includes an openable/closable exhaust port 2b of air and configured to constitute the circulation path for circulating air in the fuel cell 2 by closing the exhaust port 2b. In other words, the fuel cell 2 includes the openable/closable intake port 2a in the front face, and the openable/closable exhaust port 2b in the back face, and configured to cause air to be circulated in the fuel cell 2 by closing the intake port 2a and the exhaust port 2b.

The fuel cell stack causes electrochemical reaction between oxygen contained in the air drawn through the intake port and hydrogen supplied from the fuel tank 15 to generate power, and produces a wet excess gas after generation.

The fan generates intake negative pressure for drawing air in the instrument mounting region 36 from the intake port into the fuel cell 2, while drawing out the excess gas from the fuel cell stack and discharges it from the exhaust port. The flow of air being caused by the fan is used for the power generation in the fuel cell stack, as well as for the cooling of the fuel cell 2.

An exhaust duct 52 is provided in the rear of the fuel cell 2. The fan of the fuel cell 2 draws out excess gas from the fuel cell stack and discharges it to the exhaust duct 52. The front end part of the exhaust duct 52 is airtightly connected to a box, which is a frame body of the exhaust shutter, of the fuel cell 2. The exhaust duct 52 includes an exhaust port 52a opened toward rearwardly downward, and rearwardly upward at the rear end of the vehicle body 5. The exhaust duct 52 guides exhaust gas (excess gas) ejected from the fan of the fuel cell 2 to the exhaust port 52a and discharges it to the rear of the vehicle body 5.

The exhaust port 52a is disposed higher than the exhaust face (back face), and preferably at the upper end part of the rear section of the exhaust duct 52. In other words, the upper edge part of the exhaust port 52a is disposed at a position higher than the exhaust port of the fuel cell 2. As a result of having the exhaust port 52a disposed to be higher than the exhaust face (back face) of the fuel cell 2, the exhaust duct 52 guides a wet excess gas containing unreacted hydrogen gas to the exhaust port 52a and securely discharge it from the vehicle body 5.

The fuel tank 15 is a high-pressure compressed hydrogen storage system. The fuel tank 15 includes a pressure vessel 55 made of carbon fiber reinforced plastic (CFRP), or being a composite vessel made from an aluminum liner, a fuel filling joint 57 having a fuel filling port 56, a fuel filling main valve 58, a fuel supply main valve 59 integrally including a shut-off valve (not shown) and a regulator (not shown), and a secondary pressure reducing valve (not shown).

The pressure vessel 55 is a composite vessel made from an aluminum liner which stores hydrogen gas as fuel of the fuel cell 2. The fuel tank 15 stores, for example, hydrogen gas of about 70 megapascal (MPa.) The pressure vessel 55 includes a cylinder-shaped barrel part, and a dome-shaped mirror plate provided on front and rear end faces of the barrel part. The pressure vessel 55 is disposed in the center tunnel region 35 with the central axis of the cylindrical barrel being aligned along the front and rear direction of the vehicle body 5. The pressure vessel 55 is surrounded by a pair of upper frames 25, a pair of lower frames 24, a lower bridge frame 28, and a guard frame 29, and is robustly protected against load due to turning over or collision of the electric vehicle 1.

The pressure vessel 55 is supported in the center tunnel region 35 by a clamp band 61 constructed between an upper frame 25 disposed at one side of the vehicle body 5, for example, the upper frame 25 disposed at the right side of the vehicle body 5, and a lower frame 24 disposed at another side of the vehicle body, for example, the lower frame 24 disposed at the left side of the vehicle body 5. The pressure vessel 55 is placed on a lower clamp band, for example, a lower half part of the clamp band 61 being constructed between the right side upper frame 25 and an left side lower frame 24, and is clamped by the upper clamp band, for example, an upper half part of the clamp band 61 to be sandwiched. Note that the clamp band 61 may be constructed between the upper frame 25 disposed at the left side of the vehicle body 5 and the lower frame 24 disposed at the right side of the vehicle body 5.

The fuel filling joint 57 is disposed outside of the center tunnel region 35, more specifically, rearwardly upward of the center tunnel region 35, and at the front end part of the instrument mounting region 36. The fuel filling joint 57 is disposed to be higher than or just above the rechargeable battery 16. The fuel filling joint 57 is secured to the joint bracket 30f being constructed between the upper parts of the front protection frame 30a and the center protection frame 30b of the mounted-instrument protection frame 30. The fuel filling joint 57 extends toward upward, and slightly leftward of the vehicle body 5 such that a facility side joint can be inserted from the upper side and left side of the vehicle body at the time of fuel filling. The fuel filling joint 57 is covered and hidden by the fuel filling port lid 62 being disposed at the front end of the seat 13. The fuel filling port lid 62 is supported to the seat 13 via a hinge mechanism (not shown), and opens/closes by being swung. The fuel filling joint 57 has a fuel filling port 56 as an inlet for introducing high pressure gas of hydrogen as an fuel into the fuel tank 15.

The fuel filling port 56 is disposed at a top part of the fuel filling joint 57. The fuel filling port 56 is oriented toward the upper left of the vehicle body 5. In filling the fuel tank 15 with fuel, the upward of the fuel filling port 56 is opened to the atmosphere in a state in which the fuel filling port lid 62 is opened. Thus, in charging high pressure gas, for example, hydrogen gas as fuel, into the fuel tank 15, even if the high pressure gas leaks, the leaked fuel diffuses toward the upward of the electric vehicle 1 without residing therein.

A fuel filling main valve 58 and a fuel supply main valve 59 are integrated and incorporated in a tank valve 63 provided on the top part of the rear-side mirror plate of the pressure vessel 55. The tank valve 63 is disposed in a space surrounded by the guard frame 29. The fuel supply main valve 59 includes a shut-off valve (not shown) and a primary pressure reducing valve (not shown). The fuel filling main valve 58 and the shut-off valve of the fuel supply main valve 59 are an on-off valve using an electromagnetic valve. The primary pressure reducing valve and the secondary pressure reducing valve of the fuel supply main valve 59 successively reduce and thereby adjust the pressure of the high pressure fuel gas from the pressure vessel 55.

The rechargeable battery 16 is a box-shaped lithium ion battery. The rechargeable battery 16 is disposed in the front end part of the instrument mounting region 36 and between the rear half part of the pressure vessel 55, that is, the rear half part of the cylindrical barrel and the rear-side mirror plate, and the front half part 13a of the seat 13.

Note that, the electric vehicle 1 includes, besides the rechargeable battery 16, a second rechargeable battery (not shown) supplying, for example, 12V-based power as a power supply for meters (not shown) and lights (not shown). The second rechargeable battery is disposed around the head pipe 21, for example, beside the right side of the head pipe 21.

In the electric vehicle 1, even if hydrogen gas as fuel leaks from the fuel filling port 56, the hydrogen gas, which is lighter than air, moves up, thus diffusing to the outside of the electric vehicle 1 without residing within the electric vehicle 1. Even if hydrogen gas as fuel leaks from the fuel filling main valve 58 or the fuel supply main valve 59, the hydrogen gas moves toward the tire house region 37, thus diffusing to the outside of the electric vehicle 1 without residing within the electric vehicle 1.

The power management apparatus 17 is disposed between the rechargeable battery 16 and the fuel cell 2 in the instrument mounting region 36, and is secured to the frame 11. Note that the power management apparatus 17 may be disposed along with the rechargeable battery 16 in a same waterproof case.

By disposing the rechargeable battery 16, the power management apparatus 17, and the fuel cell 2 in a manner as described above, it becomes possible to dispose apparatuses adjoining to each other in the electrical connection to be closer to each other as much as possible, thus shortening the wiring length between the apparatuses, and reducing the weight relating to the wiring.

The vehicle controller 19 is disposed around the head pipe 21 being a relatively high place in the electric vehicle 1, for example, beside the left side of the head pipe 21 corresponding to the opposite side of the second rechargeable battery, which supplies 12V-based power.

Next, a wire harness wiring structure of the electric vehicle 1 will be described in detail.

Figure 4:
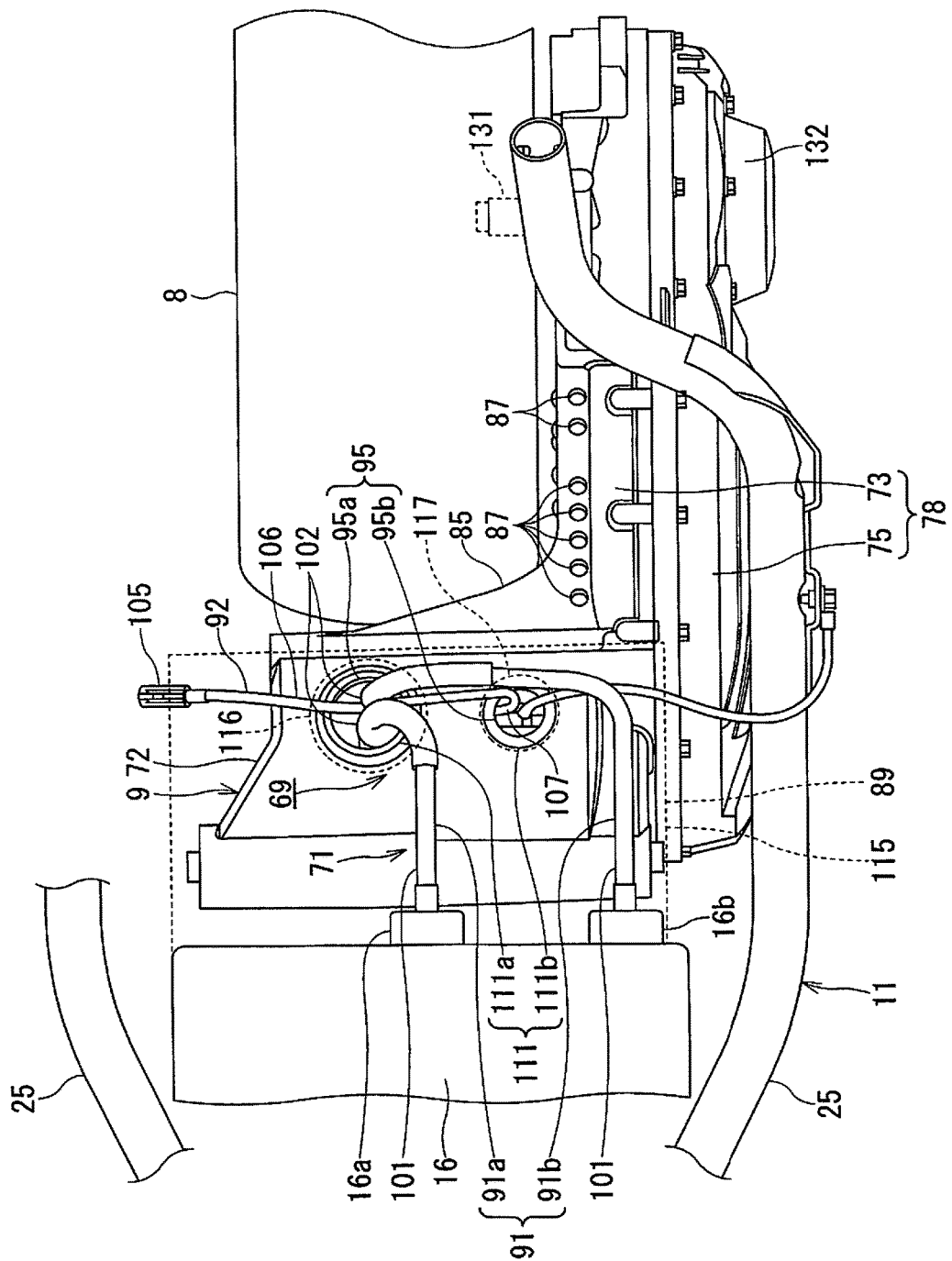
FIG. 4 is a plan view of a wire harness wiring structure of the electric vehicle according to the embodiment of the present invention.

FIG. 4 is a plan view of the wire harness wiring structure according to the embodiment of the present invention.

Figure 5:
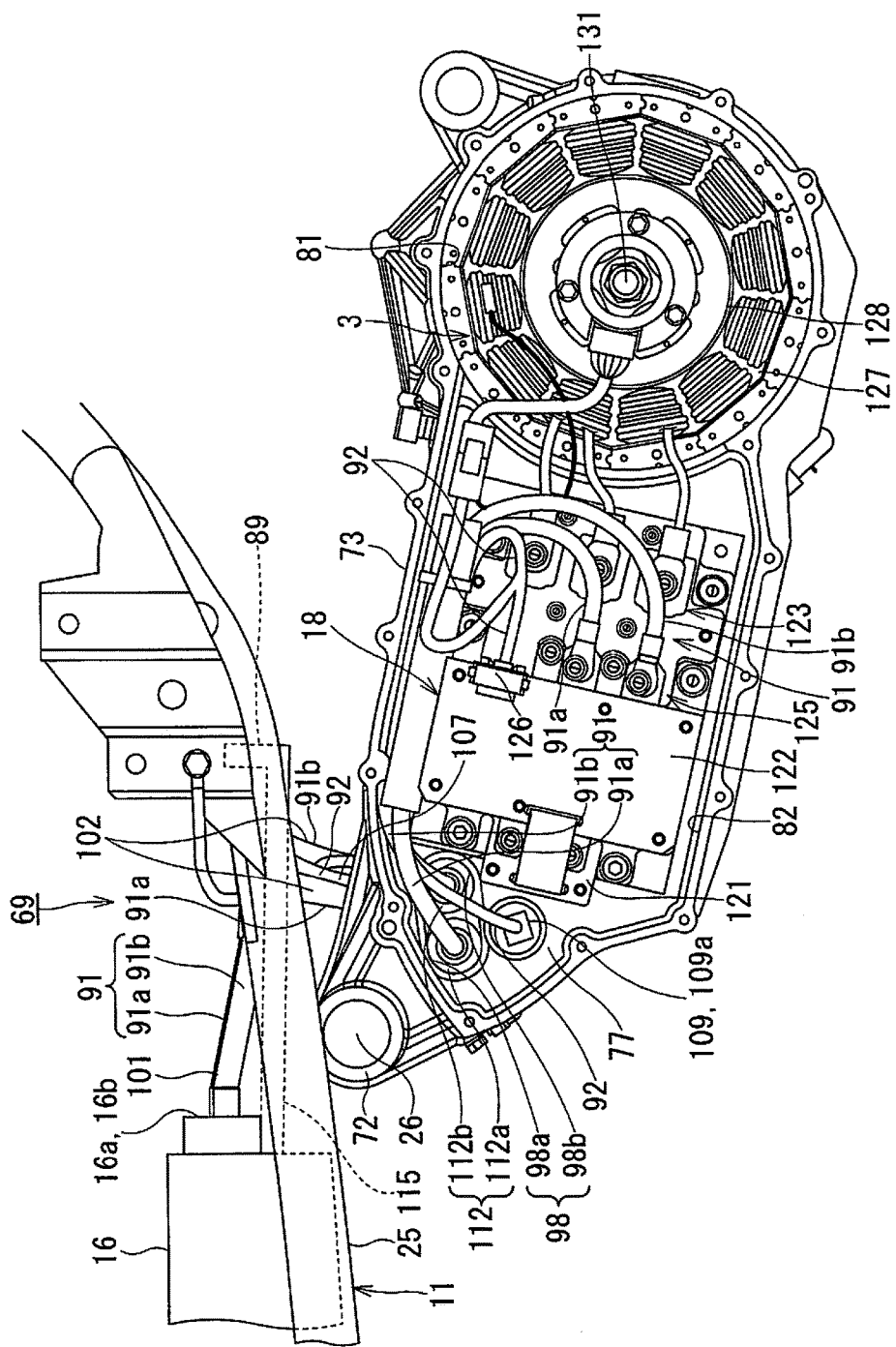
FIG. 5 is a left side view of the wire harness wiring structure of the electric vehicle according to the embodiment of the present invention.

FIG. 5 is a left side view of the wire harness wiring structure according to the embodiment of the present invention.

Figure 6:
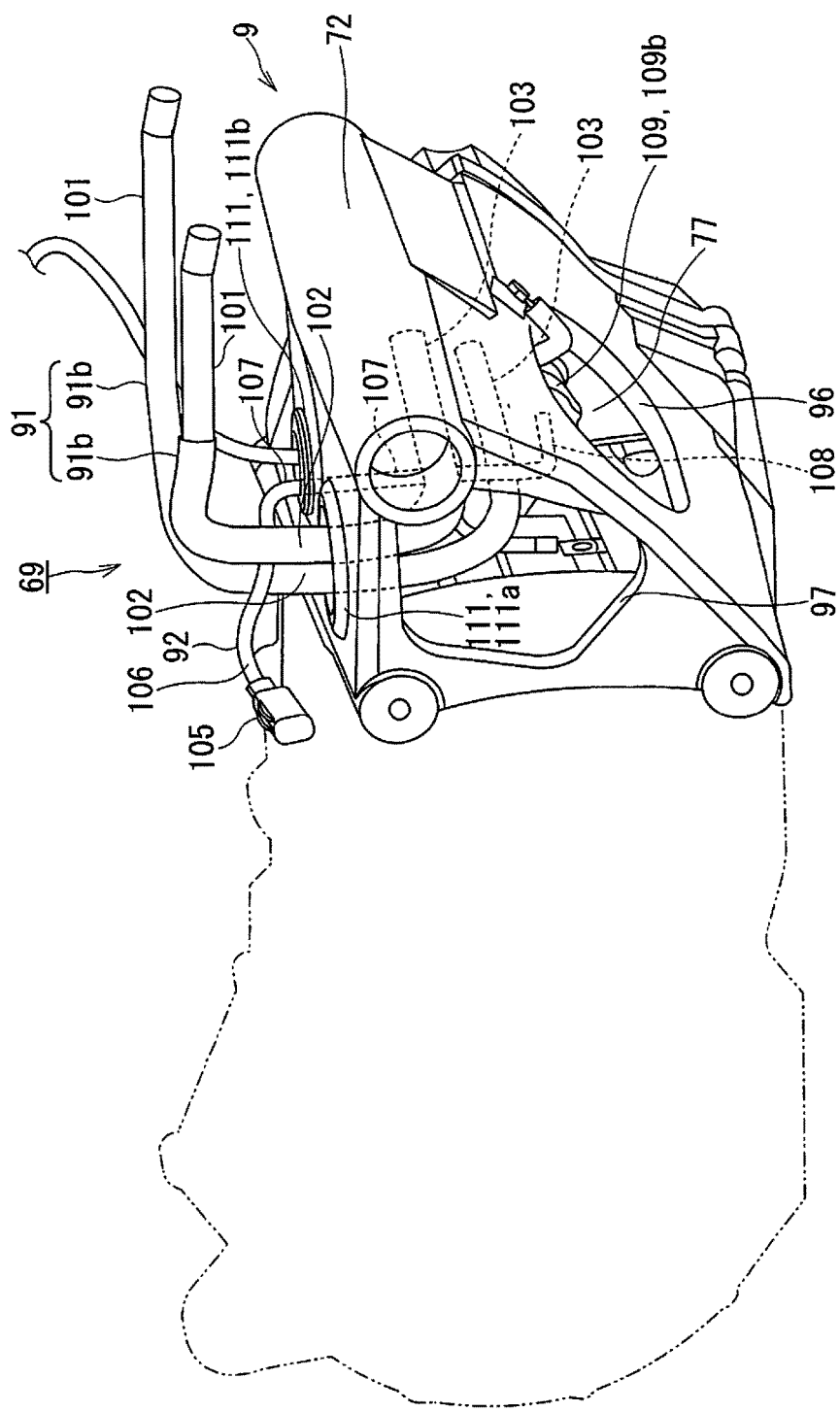
FIG. 6 is a perspective view viewed from right and front of the wire harness wiring structure of the electric vehicle according to the embodiment of the present invention.
Figure 7:
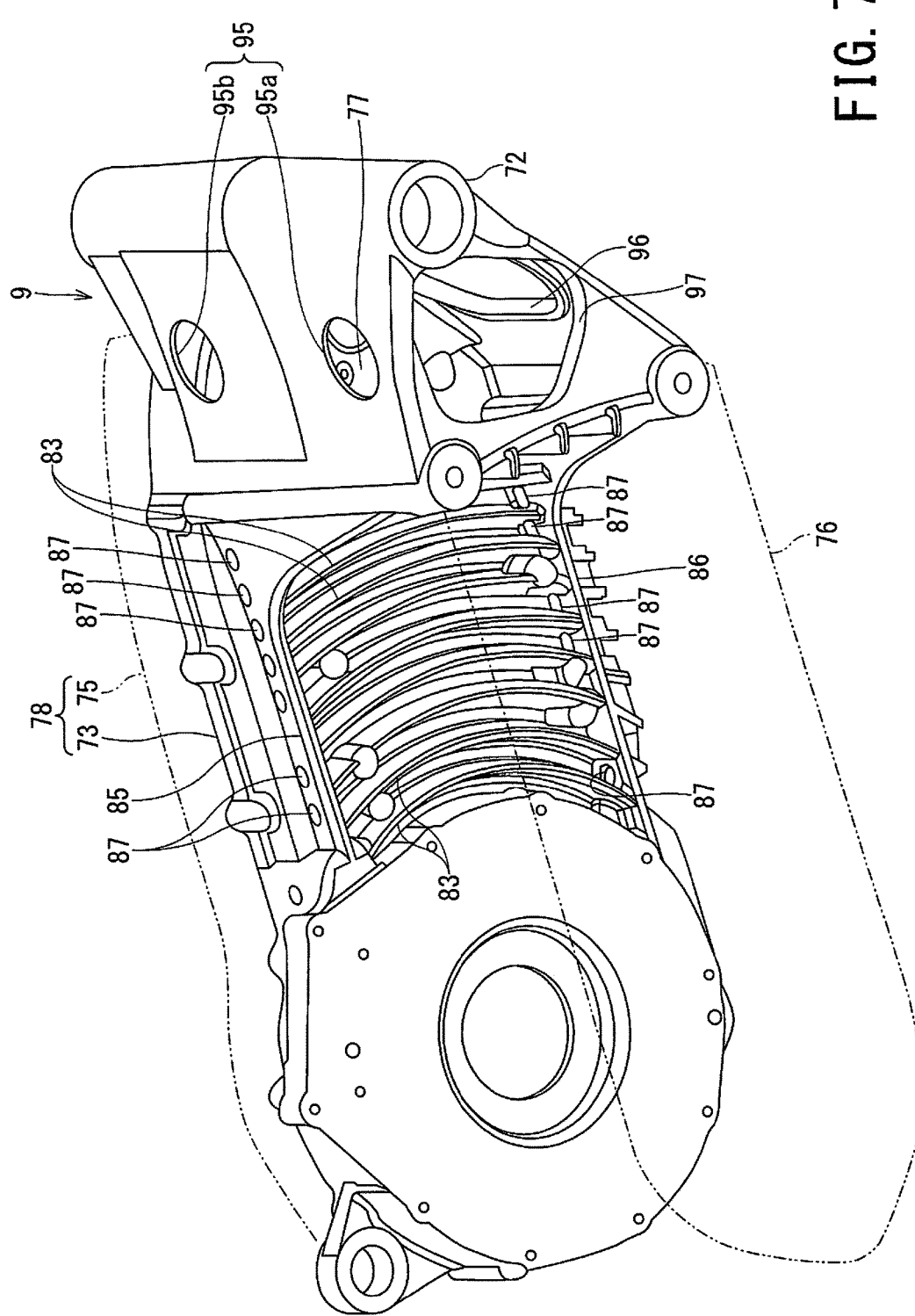
FIG. 7 is a perspective view viewed from right and front of the wire harness wiring structure of the electric vehicle according to the embodiment of the present invention.

FIGS. 6 and 7 are perspective views viewed from right and front of the wire harness wiring structure according to the embodiment of the present invention.

Figure 8:
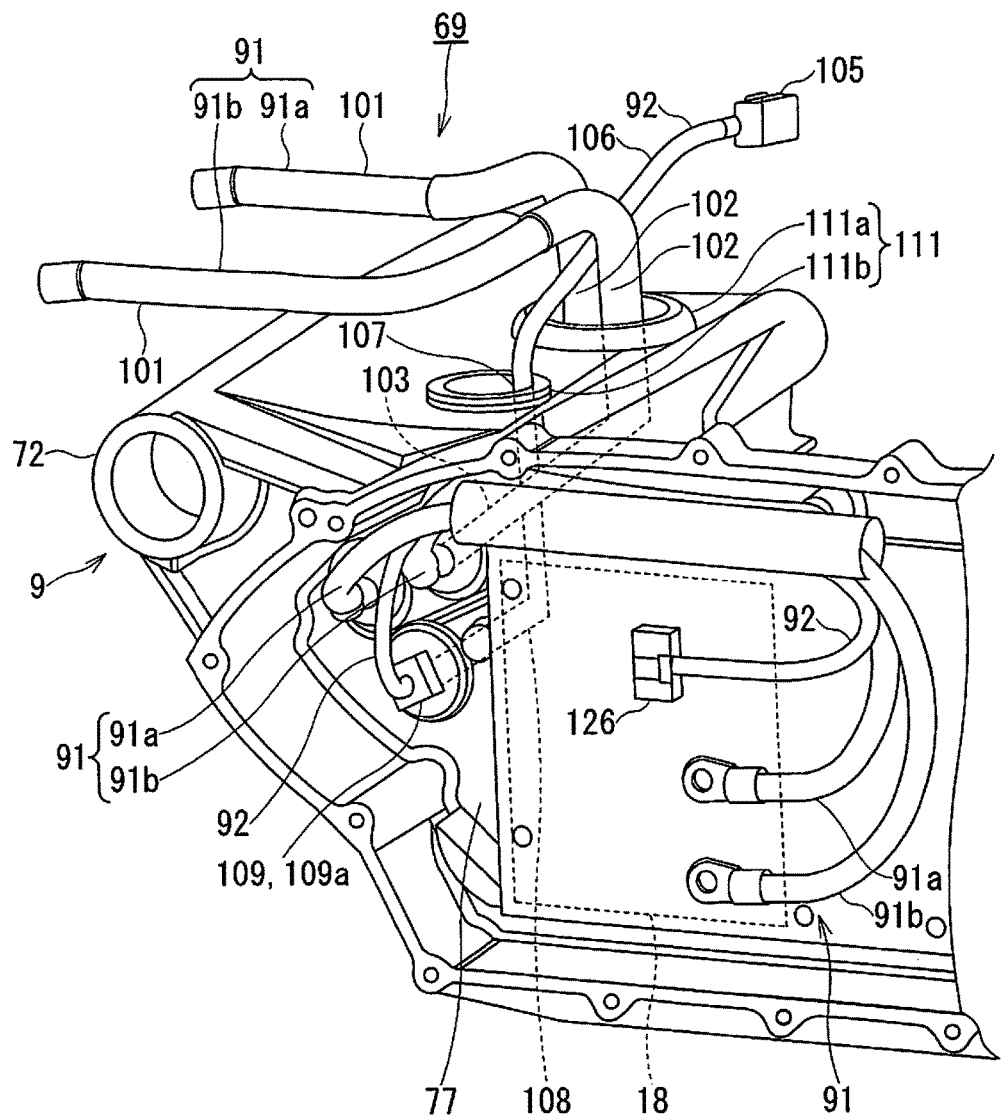
FIG. 8 is a perspective view viewed from left and rear of the wire harness wiring structure of the electric vehicle according to the embodiment of the present invention.

FIG. 8 is a perspective view viewed from left and rear of the wire harness wiring structure according to the embodiment of the present invention.

Figure 9:
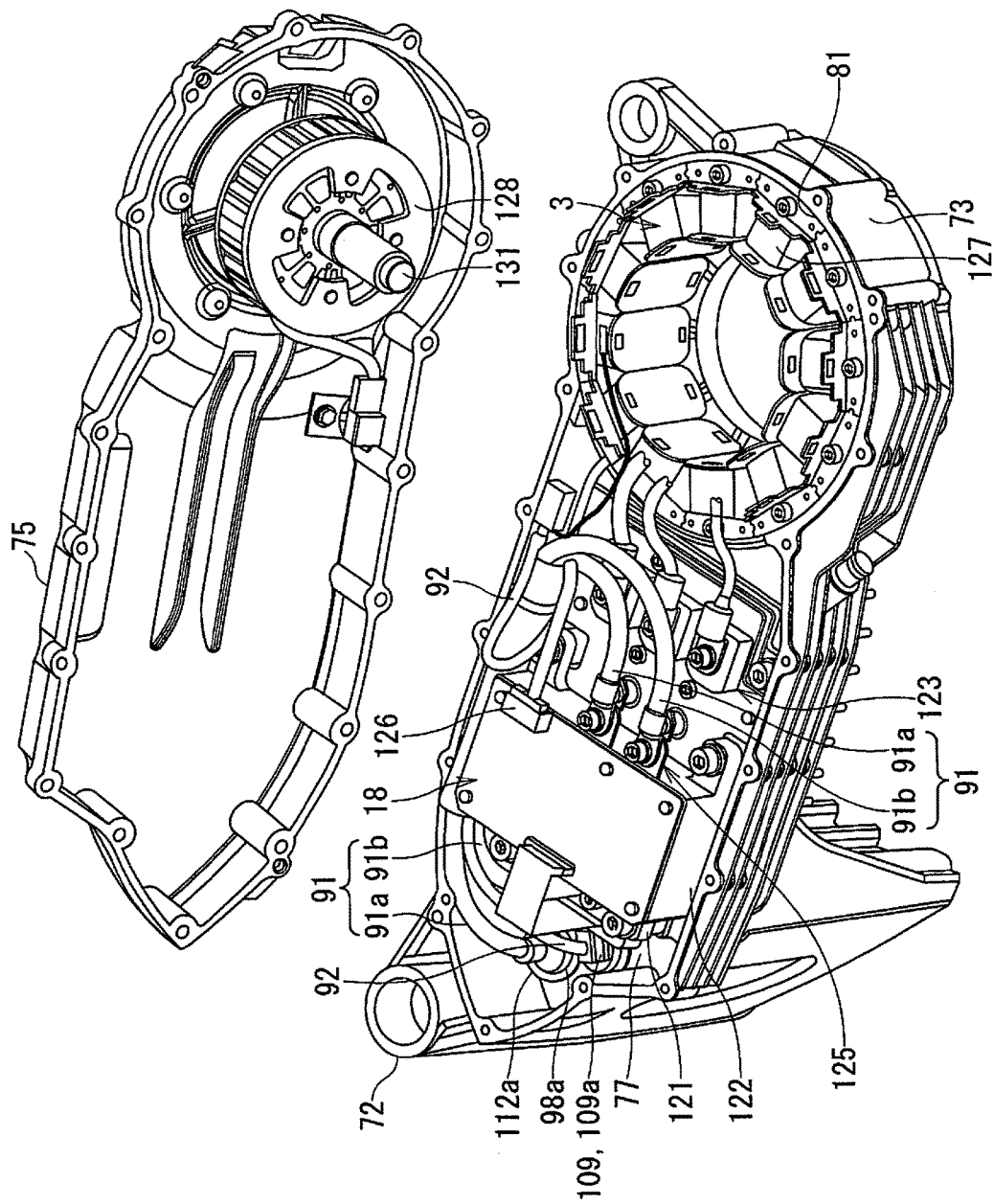
FIG. 9 is an exploded perspective view of a swing arm of the electric vehicle according to the embodiment of the present invention.

FIG. 9 is an exploded perspective view of the swing arm according to the embodiment of the present invention.

FIG. 5 is illustrated without showing a cover 75. FIG. 6 is the perspective view viewed from right and front of the wire harness wiring structure 69, in which a right side arm 76 is omitted from illustration. FIG. 7 is illustrated without showing a wire harness 71. FIG. 8 is the perspective view viewed from left and rear of the wire harness wiring structure 69 with the electric motor 3, the inverter 18, a right side arm 76, and the cover 75 being detached.

As shown in FIGS. 4 to 9, the wire harness wiring structure 69 of the electric vehicle 1 according to the present embodiment relates to a wiring path and disposition of the wire harness 71 wired between the frame 11 of the vehicle body 5 and the swing arm 9.

The swing arm 9 includes a pivot section 72 supported by the frame 11 by the pivot shaft 26, an arm 73 extending rearward from either one of sides, for example, the left side of the pivot section 72 reaching the left side of the rear wheel 8, the cover 75 covering the left side face of the arm 73, an arm 76 extending rearward from the other of the sides, for example, the right side of the pivot section 72 reaching the right side of the rear wheel 8, and a partition wall 77, partitioning between the pivot section 72 and the arm 73, extending in the longitudinal direction and the vertical direction of the vehicle body 5.

The pivot section 72 corresponds to a front end part of the swing arm 9. The pivot section 72 is swingably supported by the pivot shaft 26. The pivot section 72 extends in the width direction of the frame 11, and spreads to the whole width of the inside of the frame 11. In a side view, the pivot section 72 is a box body having a triangular shape or a fan shape, which spreads rearwardly and downwardly with a part through which the pivot shaft 26 is passed as a vertex, that is, a hollow body. The internal space of the pivot section 72 is used as a part of the wiring path of the wire harness 71.

The partition wall 77 serves as the left side wall of the pivot section 72, and also serves as a part of the inner wall of the left side arm 73, spreading in a plate shape and thereby partitioning between a space in the pivot section 72 and a space in the arm 73. A principal face on the right side of the partition wall 77 faces the space in the pivot section 72, and the principal face on the left side of the partition wall 77 faces a front end part of the space in the arm 73.

The left side arm 73 and the cover 75 constitute a driving unit housing accommodating the electric motor 3 and the inverter 18. The left side arm 73 and the cover 75 are a hollow arm section 78 extending rearward from the pivot section 72 and supporting the rear wheel 8. The arm 73 and the cover 75 are combined in such a way to be separable in the left and right direction of the electric vehicle 1 with a dividing face, which is perpendicular to the vehicle body 5 and extends in the front and rear direction of the vehicle body 5, as a boundary.

The arm 73 is integrally formed with the pivot section 72. The arm 73 has an inner wall surface, which faces the side face, for example, the left side face of the rear wheel 8. The arm 73 defines a space opening to the left side of the vehicle body 5. The arm 73 accommodates the electric motor 3 and the inverter 18 in this space.

In the rear end part of the space in the arm 73, a motor chamber 81 accommodating the electric motor 3 is defined. In front of the motor chamber 81, that is, in a space closer to the pivot section 72 than the motor chamber 81, an inverter chamber 82 for accommodating the inverter 18 is defined. The motor chamber 81 and the inverter chamber 82 are closed by the cover 75 so that inflow of outside air is restricted.

The motor chamber 81 annularly surrounds the outer periphery of the electric motor 3.

Among the wall surfaces defining the inverter chamber 82, the wall surface to which the inverter 18 is attached is an inner surface of the wall facing the rear wheel 8, and is a flat face. A plane including the wall surface and a rotational center line, that is, the axle center of the rear wheel 8 cross at right angles. The space between the flat wall surface to which the inverter 18 is attached and the inverter 18 is filled with heat radiation grease (not shown). The heat radiation grease thermally connects the inverter 18 to the arm 73.

The arm 73 includes a plurality of heat radiation fins 83 provided in the inner wall surface facing the rear wheel 8. The heat radiation fins 83 extend in an arc-shape delineating concentric circles of the rear wheel 8. Each heat radiation fin 83 extends in a arc-shape whose radius substantially corresponds to its distance from the rotational center line, that is, the axle center of the rear wheel 8. The heat radiation fins 83 are arranged substantially at an equal interval. The heat radiation fins 83 protrude from the inner wall surface of the arm 73 toward the rear wheel 8.

Each of the heat radiation fins 83 extends continuously to at least either the top face or the bottom face of the arm 73. Each of the heat radiation fins 83 has a height varying conforming to the shape of the rear wheel 8. The heat radiation fins 83 protrude conforming to the shape of the rear wheel 8 so as to leave a gap to an extent not to interfere with the rear wheel 8, and keep the gap to be substantially constant.

The arm 73 includes reinforcing ribs 85, 86 extending in the front and rear direction intersecting with the heat radiation fins 83, or along the end parts of the heat radiation fins 83.

The reinforcing ribs 85, 86 are provided on the inner wall surface facing the rear wheel 8, and protrude toward the rear wheel 8. The protruding heights of the reinforcing ribs 85, 86 are larger than those of the heat radiation fins 83 within a range not to interfere with the rear wheel 8. The reinforcing rib 85 is provided in such a way to connect with the top face of the arm 73, and along the upper end parts of the heat radiation fins 83. The reinforcing rib 86 is provided in such a way to connect with the bottom face of the arm 73, and along the lower end parts of the heat radiation fins 83.

The reinforcing ribs 85, 86, as well as the heat radiation fins 83, have varying protruding heights conforming to the shape of the rear wheel 8. The reinforcing ribs 85, 86 respectively protrude conforming to the shape of the rear wheel 8 so as to leave a gap to an extent not to interfere with the rear wheel 8, and keep the gap to be substantially constant.

The reinforcing ribs 85, 86 extend over a range from the arm 73 to the back face of the pivot section 72 in such a way to cross the front face of the rear wheel 8, and reinforces a discontinuous portion of the shape of the swing arm 9.

Further, the reinforcing ribs 85, 86 have a wind guiding port 87 connecting spaces between the adjoining heat radiation fins 83. The wind guiding port 87 straightens the air flow generated through rotation of the rear wheel 8 to smoothly guide it to the heat radiation fins 83, and thus smoothly discharge it.

The cover 75 is detachably mounted to the arm 73, and plays a role as a lid for closing the driving unit housing.

Note that the driving unit housing may be disposed on the right side of the vehicle body 5. In this case, the driving unit housing is made from combination of the right side arm 76 and the cover 75, and thus the relation thereof in the left and right is reversed.

The right side arm 76 is secured to the pivot section 72 by a fastener (not shown), for example, a bolt.

The wire harness wiring structure 69 according to the present embodiment includes the frame 11 of the vehicle body 5, the rechargeable battery 16 being mounted in the frame 11, the swing arm 9 which supporting the rear wheel 8 being swingably supported by the frame 11 via the pivot shaft 26, the inverter 18 being accommodated in the swing arm 9, the electric motor 3 being accommodated in the swing arm 9, the electric motor 3 rotating the rear wheel 8 with power supplied from the inverter 18, the wire harness 71 being wired between the frame 11 and the swing arm 9, and the wire harness 71 electrically connecting at least the rechargeable battery 16 and the inverter 18.

The wire harness wiring structure 69 includes an instrument mounting tray 89 as a holding part secured to the frame 11 and holding a horizontal portion of the wire harness 71.

The wire harness 71 includes a power line 91 transmitting power from the rechargeable battery 16, and a control signal line 92 bidirectionally transmitting communication between the vehicle controller 19 and the inverter 18. The wire harness 71, that is, the power line 91 and the control signal line 92 are wired from the vehicle body 5, or the frame 11 of the vehicle body 5 to the swing arm 9. The power line 91 and the control signal line 92 are wired between the frame 11 and the swing arm 9, and are electrically connected to the inverter 18 at the swing arm 9.

The power line 91 includes a positive-electrode line 91*a* and a negative-electrode line 91*b*.

The rechargeable battery 16 is disposed forward and upward the swing arm 9. In the back face of the rechargeable battery 16, connectors 16*a*, 16*b* that each connect the positive-electrode line 91*a* and the negative-electrode line 91*b* are provided. The connectors 16*a*, 16*b* are disposed in the back face of the rechargeable battery 16 to the left of the center line of the vehicle body 5.

The pivot section 72 of the swing arm 9 has at least one upper through port 95 provided in a ceiling wall. In this embodiment, the upper through ports 95 include a first upper through port 95*a* and a second upper through port 95*b*. The first upper through port 95*a* is disposed to the right of the center line, that is, on the right side of the center line of the vehicle body 5, and the second upper through port 95*b* is disposed to the left of the center line, that is, on the left side of the center line of the vehicle body 5. The first upper through port 95*a* and the second upper through port 95*b* are aligned in the width direction of the vehicle body 5.

The first upper through port 95*a* and the second upper through port 95*b* may be, for example, circular, but not limited. The first upper through port 95*a* and the second upper through port 95*b* may be connected to each other to be one opening.

The pivot section 72 has a first working port 96 for the wiring work of the wire harness 71 to be provided on a bottom wall, and a second working port 97 for the wiring work of the wire harness 71 to be provided on a right side wall.

Each of the working ports 96, 97 has an appropriate shape and an opening area, through which a human finger can be inserted into a space within the pivot section 72. The working ports 96, 97 are used when performing the work to dispose the wire harness 71 in the internal space of the pivot section 72. The worker easily performs the work to dispose the wire harness 71 in the internal space of the pivot section 72 by inserting its finger through the working port 96, 97.

The back wall of the pivot section 72 is a robust wall surface facing the rear wheel 8. The back wall of the pivot section 72 has no opening. The back wall of the pivot section 72 protects the power line 91 and the control signal line 92 from, for example, gravel, mud, and water splashed by the rear wheel 8.

Note that although the pivot section 72 has a box-shaped structure having definite wall surfaces, it may be a frame structure having no definite wall surface.

The partition wall 77 of the swing arm 9 has at least one partition-wall through port 98. The wire harness 71 is wired from the pivot section 72 side to the arm section 78 side through the partition-wall through port 98. In this embodiment, the partition-wall through ports 98 include the first partition-wall through port 98*a* and the second partition-wall through port 98*b*. The opening diameter of the partition-wall through port 98 is larger than the diameter of the wire harness 71. That is, the opening diameter of the first partition-wall through port 98*a* is larger than the diameter of the positive-electrode line 91*a*, and the opening diameter of the second partition-wall through port 98*b* is larger than the negative-electrode line 91*b*. In other words, the positive-electrode line 91*a* and the negative-electrode line 91*b* are wired respectively through different through ports. The upper through port 95 and a partition-wall through port 98 are smaller than the working ports 96, 97.

The wire harness 71 has an upper horizontal part, which bends to the horizontal direction on the frame 11 side, suspends from the frame 11 side, enters from the top face side of the pivot section 72 to the inside of the pivot section 72, and bends inside the pivot section 72 reaching the partition-wall through port 98.

The power line 91 includes an upper horizontal part 101 extending rearward, substantially along the horizontal plane of the vehicle body 5, from a connector 16*a*, 16*b* provided in the back face of the rechargeable battery 16 to the left of the center line of the vehicle body 5, and held by an instrument mounting tray 89, a vehicle width direction part bending from the rear end of the upper horizontal part 101 to reach to the right side of the center line of the vehicle body 5, a suspended part 102 bending from the vehicle width direction part almost right above the pivot section 72 of the swing arm 9 and suspending downwardly, the suspended part 102 reaching the inside of the pivot section 72 through the first upper through port 95*a* of the ceiling face of the pivot section 72, and a lower horizontal part 103 bending from the lower end of the suspended part 102 within the pivot section 72, the lower horizontal part 103 extending substantially along the horizontal plane of the vehicle body 5 to the left of the center line of the vehicle body 5.

The power line 91 is held via the seal part 112 by the partition-wall through port 98, that is, the first partition-wall through port 98*a* and the second partition-wall through port 98*b* of the partition wall 77 defining an internal space between the pivot section 72 of the swing arm 9 and the left side arm 73. The partition wall 77 is disposed to the left of the center line of the vehicle body 5. The power line 91 reaches the inside of the left side arm 73 through the partition-wall through port 98.

That is, the power line 91 extends from the connectors 16a, 16b on the left side of the center line of the vehicle body 5, temporarily circumvents the right side of the center line of the vehicle body 5, and thereafter is wired in the pivot section 72 in the arm 73 on the left side of the center line of the vehicle body 5.

The upper horizontal part 101 and the lower horizontal part 103 may bend in the halfway, or undulate in the up and down direction as long as they extend substantially in the horizontal direction. The upper horizontal part 101 is surrounded by the frame 11 of the vehicle body 5. The lower horizontal part 103 is contained in the space in the pivot section 72.

Since the lower horizontal part 103 extends from the first partition-wall through port 98a, which is disposed to the right of center, to the partition wall 77, which is disposed to the left of center, it straddles the center of the vehicle body 5, that is, center line of the vehicle body 5 within the pivot section 72.

The suspended part 102 may bend in the halfway, or may undulate in the front, rear, left and right directions as long as it extends substantially in the up and down direction. The suspended part 102 is wired over between the vehicle body 5 and the swing arm 9. The suspended part 102 and a protection part 111 to be described later are in a dimensional relation in which a gap exits and no contact occurs between them in a normal condition.

The control signal line 92 includes an upper horizontal part 106 extending from a first relaying connector 105 connecting to the vehicle controller 19 disposed on the right side of the center line of the vehicle body 5, substantially along the horizontal plane of the vehicle body 5, in the width direction of the vehicle body 5 above the pivot section 72, reaching the left side of the center line of the vehicle body 5, a suspended part 107 bending from the left end part of the upper horizontal part 106 and suspends downward, reaching the inside of the pivot section 72 through the second upper through port 95b of the ceiling face of the pivot section 72, and a lower horizontal part 108 bending within the pivot section 72 and extending leftward substantially along the horizontal plane of the vehicle body 5.

The control signal line 92 reaches the inside of the right-side arm 76 via a second relaying connector 109 provided in the partition wall 77 defining the internal space between the pivot section 72 and the right-side arm 76.

The upper horizontal part 106 and the lower horizontal part 108 may bent in the halfway, or undulate in the up and down direction as long as they extend substantially in the horizontal direction. The upper horizontal part 106 is surrounded by the frame 11 of the vehicle body 5, and the lower horizontal part 108 is contained in the space within the pivot section 72.

The suspended part 107 may bent in the halfway, or undulate in the front, rear, left and right directions as long as they extend substantially in the up and down direction. The suspended part 107 is wired over between the vehicle body 5 and the swing arm 9.

The second relaying connector 109 has a connection portion within the pivot section 72. The second relaying connector 109 is connected within the pivot section 72 so as to relay the control signal line 92. A contact plug seat 109a of the second relaying connector 109 is arranged to pass through the front and back faces of the partition wall 77, and secured to the partition wall 77. A contact plug 109b of the second relaying connector 109 is provided at a tip end of a part where the control signal line 92 is inserted in the pivot section 72.

The wire harness wiring structure 69 includes a protection part 111 provided on an edge of the upper through port 95 and preventing direct interference between the wire harness 71 and the pivot section 72, and a seal part 112 blocking up a gap between the partition wall 77 and the wire harness 71 in a water-tight state.

The protection part 111 covers an opening edge part of the upper through port 95 to prevent the power line 91 from coming into contact with the opening edge part and being damaged. The protection part 111 is for example a grommet made of synthetic resin or rubber. The protection part 111 includes a protection part 111a provided at a first upper through port 95a through which the power line 91 is passed, and a protection part 111b provided at a second upper through port 95b through which the control signal line 92 is passed. An inner diameter of the protection part 111 is large enough with respect to the outer diameter of the power line 91 to prevent contact in a normal state, while the movement of the suspended part 102 will not be hindered.

The seal part 112 secures the wire harness 71 to the partition-wall through port 98. That is, the seal part 112a secures the positive-electrode line 91a to the first partition-wall through port 98a thereby filling up the gap, and the seal part 112b secures the negative-electrode line 91b to the second partition-wall through port 98b thereby filling up the gap. The seal part 112 is a ring made of rubber such as silicon rubber.

The instrument mounting tray 89 is provided on the vehicle body 5. The instrument mounting tray 89 supports the rechargeable battery 16 and the vehicle controller 19 on the frame 11, and has a wire harness securing part 115 extending further rearward than the mounted instrument. The wire harness securing part 115 extends in such a way to cover above the pivot section 72 of the swing arm 9 to supports and protects an upper horizontal part 101 of the power line 91 and an upper horizontal part 106 of the control signal line 92 via a clamp (not shown). The wire harness securing part 115 has an opening 116 through which a suspended part 102 of the power line 91 is passed, and an opening 117 through which a suspended part 102 of the control signal line 92 is passed. The opening 116 is disposed substantially right above the first upper through port 95a of the pivot section 72. The opening 117 is disposed substantially right above the second upper through port 95b of the pivot section 72.

The electric motor 3 and the inverter 18 are accommodated in the arm section 78, that is, the driving unit housing defined by the left side arm 73 and the cover 75.

The inverter 18 includes an inverter circuit 121, a control circuit 122 controlling the inverter circuit 121, and a motor terminal block 123 to which a power line for transmitting power from the inverter circuit 121 to the electric motor 3 is connected. The inverter circuit 121, the control circuit 122, and the motor terminal block 123 are disposed in order from the side near to the pivot section 72 of the swing arm 9. The electric motor terminal block 123 is disposed closest to the electric motor 3.

Between the control circuit 122 and the motor terminal block 123, there is provided a power terminal block 125 relaying the power supplied from the fuel cell 2 or the rechargeable battery 16 to the inverter circuit 121. The power terminal block 125 is disposed in the lower half portion of the inverter 18. The power line 91 transmitting power from the rechargeable battery 16 is connected to the power terminal block 125.

Between the control circuit 122 and the motor terminal block 123, and in the upper half side of the inverter 18, there is provided a control signal connector 126 connected to the control circuit 122.

The control signal line 92, bidirectionally transmitting communications to and from the vehicle controller 19, is connected to the control signal connector 126. The control signal line 92 includes bundled plural element wires (not shown).

The power line 91 enters into the arm 73 through the partition-wall through port 98 of the partition wall 77.

The control signal line 92 enters into the arm 73 through the second relaying connector 109 provided in the partition wall 77.

The power line 91 and the control signal line 92 once join together while proceeding toward a ceiling wall of the arm 73, extend rearward in the arm 73 through a gap between the upper section of the inverter 18 and the ceiling wall of the arm 73, proceed downward in the arm 73 circumventing the motor terminal block 123, and reach the corresponding the power terminal block 125 and the control signal connector 126.

The electric motor 3 includes an annular stator 127 secured in the motor chamber 81 in the arm 73, and a disc-shaped rotator 128 disposed in a center part of the stator 127, and a motor shaft 131 passing through the center of the rotator 128.

The motor shaft 131 is rotatably and integrally secured to the rotator 128. One end part of the motor shaft 131 is interconnected with and supported by a speed reducer (not shown) provided between the arm 73 and the rear wheel 8. The other end part of the motor shaft 131 is rotatably supported by a bearing (not shown) provided in the cover 75. The other end part of the motor shaft 131 passes through the cover 75 to reach the outside of the cover. The other end part of the motor shaft 131 is covered and hidden by a cap 132 secured to the cover 75.

The swing arm 9 swings in the up and down direction centered on the pivot shaft 26 to enhance the ground contact force of the rear wheel 8 and buffer the load from the road to the vehicle body 5. The displacement due to this swinging acts as load to the power line 91 and the control signal line 92 wired between the vehicle body 5 and the swing arm 9.

The wire harness wiring structure 69 includes lower horizontal parts 103 and 108, which extend substantially in parallel with the pivot shaft 26, in the power line 91 and the control signal line 92.

In a conventional wire harness wiring structure, swinging of the swing arm imposes load on the duct through which a wire harness is passed, causing buckling of the duct as well as buckling of the wire harness, and tension of the duct as well as tension of the wire harness. Such buckling and tension imposed on the wire harness may cause frequent contacts between the wire harness and the duct, thereby leading to damages of outer face of wire harness, and breakage of element wires.

However, in the wire harness wiring structure 69 according to the present embodiment, mostly the lower horizontal parts 103 and 108 disposed within the pivot section 72 are bent, thereby causing the wire harness 71 to follow the swinging of the swing arm 9.

The wire harness wiring structure 69 is configured such that the upper horizontal parts 101, 106 of the wire harness 71 is secured to the vehicle body 5, or the frame 11 of the vehicle body 5 with a clamp, thereby restricting the displacement of this area, and the suspended parts 102, 107 that are less deformable than the lower horizontal parts 103, 108 in the swinging direction of the swing arm 9 are wired between the vehicle body 5 and the swing arm 9, thereby causing the deformation of the wire harness 71 due to the swinging of the swing arm 9 to be concentrated on the lower horizontal parts 103, 108.

Since the lower horizontal parts 103, 108 extend in the horizontal direction of the vehicle body 5, they deform in bending as the swing arm 9 swings. Since the amount of bending deformation of the lower horizontal parts 103, 108 are easily presumed, it becomes possible to presume and estimate the durability thereof, improve guaranteed accuracy, and to provide enough protection by accommodating the bending deformation within the pivot section 72. Since the lower horizontal part 103 extends in parallel with the pivot shaft 26 and straddles the center of the pivot section 72, it is easy to ensure its length and is possible to reduce its bending stress.

Since the lower horizontal parts 103, 108 are contained in the space within the pivot section 72 closer to the pivot shaft 26, compared with in the rear end side of the swing arm 9, it is possible to reduce the amount of deformation associated with swinging to be low.

The electric vehicle 1 according to the present embodiment, by providing the wire harness 71 suspending from the frame 11 side, entering inside the pivot section 72 from the top face side of the pivot section 72, bending inside the pivot section 72, and reaching the partition-wall through port 98, it is possible to permit deformation of the wire harness 71 associated with swinging of the swing arm 9, and easily secure a space for protecting the wire harness 71 in the pivot section 72. This allows the wire harness wiring structure 69 to avoid interference between the wire harness 71 and other parts of the electric vehicle 1, and protects the wire harness 71 from foreign objects such as incoming rocks and sand during travelling.

Further, in the electric vehicle 1 according to the present embodiment, the protection part 111 makes it possible to avoid the interference in case of emergency between the wire harness 71 and the swing arm 9, and the seal part 112 makes it possible to arrest foreign matter and water from entering into the driving unit housing, which accommodates the electric motor 3 and the inverter 18, thereby maintaining the soundness of mounted instruments.

Further, in the electric vehicle 1 according to the present embodiment, by securing the upper horizontal parts 101, 106 to the vehicle body 5 side and thereby preventing the wire harness 71 from being deformed in the vehicle body 5, it is made possible to substantially neglect effects on the instruments to be mounted in the vehicle body 5, and restrict the stress concentration in connection terminal parts, thereby to provide protection.

Furthermore, in the electric vehicle 1 according to the present embodiment, it is possible to dispose the second relaying connector 109 of the control signal line 92 within the pivot section 72, thereby protecting it.

Further, in the electric vehicle 1 according to the present invention, the working ports 96, 97 are provided in the pivot section 72, and thereby it is possible to easily incorporate the wire harness 71 in the pivot section 72.

Therefore, the electric vehicle 1 according to the present invention surely avoids interference with the swing arm 9 while flexibly following the swinging of the swing arm 9, thus exhibits excellent durability.

DESCRIPTION OF SYMBOLS

1 Fuel cell powered two-wheel vehicle
2 Fuel cell

2a Intake port
2b Exhaust port
3 Motor
5 Vehicle body
6 Front wheel
7 Steering mechanism
8 Rear wheel
9 Swing arm
11 Frame
12 Exterior
13 Seat
13a Front half part
13b Rear half part
13c Inclined part
15 Fuel tank
16 Rechargeable battery
16a, 16b Connector
17 Power management apparatus
18 Inverter
19 Vehicle controller
21 Head pipe
22 Upper down-frame
23 Lower down-frame
24 Lower frame
25 Upper frame
26 Pivot shaft
26a Bracket
27 Upper bridge frame
28 Lower bridge frame
29 Guard frame
30 Mounted-instrument protection frame
30a Front protection frame
30b Center protection frame
30c Rear protection frame
30d Side protection frame
30e Bracket
30f Joint bracket
31 Foot board
31a Foot rest bracket
33 Center stand
34 Near-head-pipe bridge frame
35 Center tunnel region
36 Instrument mounting region
37 Tire house region
38 Rear fender
41 Front leg-shield cover
42 Front frame cover
43 Frame cover
45 Handle
46 Front fork
47 Front fender
48 Rear suspension
52 Exhaust duct
52a Exhaust port
55 Pressure vessel
56 Fuel filling port
57 Fuel filling joint
58 Fuel filling main valve
59 Fuel supply main valve
61 Clamp band
62 Fuel filling port lid
63 Tank valve
69 Wire harness wiring structure
71 Wire harness
72 Pivot section
73, 76 Arm
75 Cover
77 Partition wall
78 Arm section
81 Motor chamber
82 Inverter chamber
83 Heat radiation fin
85, 86 Reinforcing rib
87 Wind guiding port
89 Instrument mounting tray
91 Power line
91a Positive-electrode line
91b Negative-electrode line
92 Control signal line
95 Upper through port
95a First upper through port
95b Second upper through port
96 First working port
97 Second working port
98 Partition-wall through port
98a First partition-wall through port
98b Second partition-wall through port
101, 106 Upper horizontal part
102, 107 Suspended part
103, 108 Lower horizontal part
105 First relaying connector
109 Second relaying connector
109a Contact plug seat
109b Contact plug
111, 111a, 111b Protection part
112, 112a, 112b Seal part
115 Wire harness securing part
116, 117 Opening
121 Inverter circuit
122 Control circuit
123 Motor terminal block
125 Power terminal block
126 Control signal connector
127 Stator
128 Rotator
131 Motor shaft
132 Cap

What is claimed is:

1. An electric vehicle, comprising:
a frame;
a driving wheel;
a battery mounted to the frame;
a pivot shaft provided on the frame;
a swing arm swingably supported by the frame via the pivot shaft, and supporting the driving wheel;
an inverter accommodated in the swing arm;
a electric motor accommodated in the swing arm and rotating the driving wheel by power supplied from the inverter; and
a wire harness wired between the frame and the swing arm, the wire harness including a power line electrically connecting at least the battery and the inverter, wherein
the swing arm includes: a hollow pivot section swingably supported by the pivot shaft, the hollow pivot section extending in a width direction of the frame; a hollow arm extending rearward from the pivot section and supporting the driving wheel; and a partition wall partitioning the pivot section and the arm section, and extending in a front and rear direction and an up and down direction of the frame,
the inverter and the electric motor are accommodated in the arm section,
the partition wall has a partition-wall through port, the wire harness is wired from the pivot section side to the arm section side through the partition-wall through port, and the wire harness suspends from the frame side, enters inside the pivot section from the top face side of the pivot section, and is bent inside the pivot section reaching the inverter through the partition-wall through port.

2. The electric vehicle according to claim 1, wherein the pivot section has an upper through port disposed in a top face, and the wire harness is passed across a gap through the upper through port, and includes:

a seal part water tightly sealing a gap between the partition wall and the wire harness; and a protection part provided on an edge of the upper through port and preventing interference between the wire harness and the pivot section.

3. The electric vehicle according to claim 1, wherein the wire harness has a horizontal portion disposed in a horizontal direction on the frame side, and includes:

a holding part secured to the frame and holding the horizontal portion of the wire harness.

4. The electric vehicle according to claim 2, wherein the wire harness has a horizontal portion disposed in a horizontal direction on the frame side, and includes:

a holding part secured to the frame and holding the horizontal portion of the wire harness.

5. The electric vehicle according to claim 1, further comprising:

a signal line wiring between the frame and the swing arm, and electrically connected to the inverter; and a relaying connector provided within the pivot section and relaying the signal line.

6. The electric vehicle according to claim 2, further comprising:

a signal line wiring between the frame and the swing arm, and electrically connected to the inverter; and a relaying connector provided within the pivot section and relaying the signal line.

7. The electric vehicle according to claim 3, further comprising:

a signal line wiring between the frame and the swing arm, and electrically connected to the inverter; and a relaying connector provided within the pivot section and relaying the signal line.

8. The electric vehicle according to claim 4, further comprising:

a signal line wiring between the frame and the swing arm, and electrically connected to the inverter; and a relaying connector provided within the pivot section and relaying the signal line.

9. The electric vehicle according to claim 1, wherein
the pivot section has a working port for use when performing wiring work of the wire harness.

10. The electric vehicle according to claim 2, wherein
the pivot section has a working port for use when performing wiring work of the wire harness.

11. The electric vehicle according to claim 3, wherein
the pivot section has a working port for use when performing wiring work of the wire harness.

12. The electric vehicle according to claim 4, wherein
the pivot section has a working port for use when performing wiring work of the wire harness.

13. The electric vehicle according to claim 5, wherein
the pivot section has a working port for use when performing wiring work of the wire harness.

14. The electric vehicle according to claim 6, wherein
the pivot section has a working port for use when performing wiring work of the wire harness.

15. The electric vehicle according to claim 7, wherein
the pivot section has a working port for use when performing wiring work of the wire harness.

16. The electric vehicle according to claim 8, wherein
the pivot section has a working port for use when performing wiring work of the wire harness.

* * * * *